A. P. WHITTEMORE.
METHOD AND APPARATUS FOR MAKING SHEET GLASS.
APPLICATION FILED FEB. 1, 1912.
1,087,154.
Patented Feb. 17, 1914.
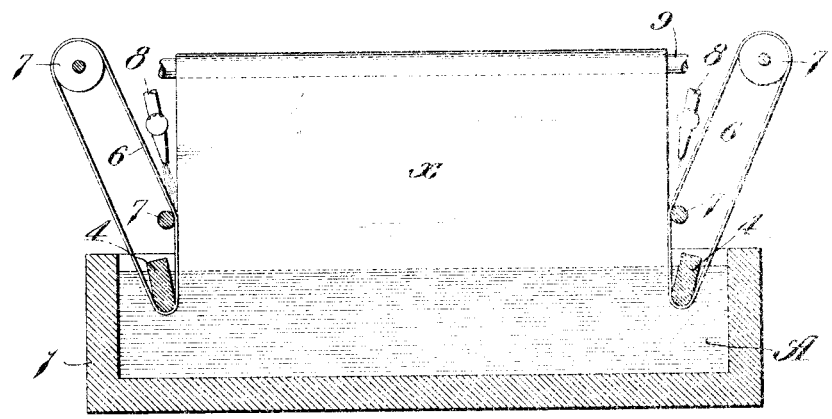
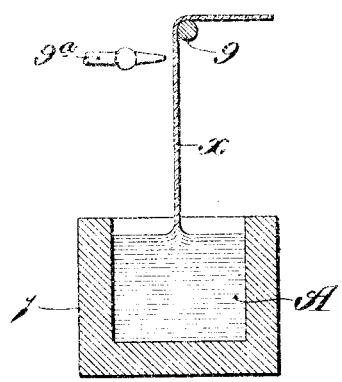

UNITED STATES PATENT OFFICE.

ALLAN P. WHITTEMORE, OF KIRKWOOD, MISSOURI, ASSIGNOR OF ONE-THIRD TO WYATT SHALLCROSS, OF ST. LOUIS, MISSOURI.

METHOD AND APPARATUS FOR MAKING SHEET-GLASS.

1,087,154.     Specification of Letters Patent.     Patented Feb. 17, 1914.

Application filed February 1, 1912. Serial No. 674,563.

*To all whom it may concern:*

Be it known that I, ALLAN P. WHITTEMORE, a citizen of the United States, residing at Kirkwood, Missouri, have invented a certain new and useful Improvement in Methods and Apparatus for Making Sheet-Glass, of which the following is a full, clear, and exact description, such as will enable others skilled in the art to which it appertains to make and use the same.

This invention relates to the manufacture of sheet glass.

The main object of my invention is to provide a simple, rapid and inexpensive method of making sheet glass that enables a sheet of glass of approximately uniform width to be drawn from a mass of molten glass.

Another object is to provide a method of the character described that will produce a sheet of glass of approximately uniform width and approximately uniform thickness whose surface has a fine fire polish and is free from the defects caused by flattening cylinder glass, namely, glass made by the cylinder method now in general use. And another object is to provide a machine or apparatus for practising my method.

Briefly described, my method consists in forming a sheet of glass from a mass of molten glass, either by drawing the sheet or by allowing the molten glass to escape from the pot or tank in which it is contained in the form of a sheet, supporting the side edges of the sheet at a point adjacent the mass of molten glass so as to counteract the tendency of the sheet to contract or narrow down to a thread, thus producing a sheet of glass of approximately uniform width, and stripping the sheet from the members or devices that support or sustain the side edges of the sheet after the sheet has reached such a point that there is little tendency for it to narrow down or contract.

Various kinds of apparatus may be used for practising my method and the operation may either be continuous or single sheets may be formed one at a time.

Figure 1 of the drawings is a front elevational view partly in vertical section of one form of apparatus that may be used for practising my method; and Fig. 2 is a vertical transverse sectional view of Fig. 1.

Referring to Fig. 1 of the drawings, 1 designates a pot, container or tank that holds a mass of molten glass A, into which a ball of any suitable design is adapted to be immersed and then moved upwardly so as to draw a sheet of glass from the molten glass in the pot 1. It is well known that when an attempt is made to draw a sheet of molten glass the tendency of the sheet is to narrow down or draw to a thread. I have discovered that this tendency of the sheet to narrow down to a thread can be counteracted by supporting the side edges of the sheet at a point adjacent to or at the surface of the mass of molten glass A in the container 1, thus enabling a sheet of glass of approximately uniform width to be drawn from a mass of molten glass. One way of accomplishing this is to arrange members adjacent the side edges of the sheet to which the sheet will adhere as it is being drawn from the mass of molten glass in the pot and moving said members at the same speed that the sheet is traveling, and stripping said sustaining members from the sheet after the sheet has reached such a point that there is little tendency for it to narrow down or contract. In Fig. 1 I have shown an apparatus for forming sheets of glass in this manner, the apparatus comprising a ball which is adapted to be immersed in the mass of molten glass A in the pot 1, a pair of endless belts 6 mounted on guide rollers 7 and arranged in such a manner that the side edges of the sheet will adhere to same as it is being drawn from the mass of molten glass A, and members 8 such, for example, as burners, arranged at such a point that they will strip the belts or members 6 from the side edges of the sheet after the sheet has reached such a point in its upward travel that there is little tendency for it to shrink or narrow down to a thread. The sheet may be moved vertically throughout its entire length or it may be moved vertically for a short distance and then horizontally over a guide roller 9 arranged adjacent to burners 9ᵃ, as shown in Fig. 2.

While I prefer to form the sheet by drawing it from a mass of molten glass I do not wish it to be understood that my broad idea is limited to such a method for it might be practicable to allow the molten glass to flow out of its pot, tank or container in the form of a sheet and arrange sustaining members in such a manner that the side edges of the sheet would adhere to same until after it had reached such a point that there was little tendency for it to shrink or become narrow.

I have not herein illustrated a leer or any of the other apparatus that it might be desirable to use in manufacturing glass according to this method as my present invention relates only to a method for overcoming the tendency of sheets of drawn glass to shrink or narrow down to a thread, and an apparatus for accomplishing this result.

Sheet glass produced by the method above-described has a brilliant fire finish and its surface is perfectly free from the defects caused by the present commercial method of flattening sheet glass.

Having thus described my invention, what I claim as new and desire to secure by Letters Patent is:

1. A method of making sheet glass which consists in progressively forming a sheet of glass from a mass of molten glass, sustaining the side edges of said sheet adjacent said mass of molten glass so as to counteract the tendency of the sheet to narrow down or draw to a thread, and stripping the side edges of the sheet from the means that sustains same after the sheet has reached such a point that there is little tendency for it to narrow down or contract.

2. A method of making sheet glass which consists in drawing a sheet of glass from a mass of molten glass, sustaining the side edges of said sheet until the sheet has reached such a condition that there is little tendency for it to narrow or shrink, and thereafter subjecting the edge portions of the sheet to heat so as to strip it from the means that sustains the side edges of same.

3. A method of making sheet glass which consists in drawing a sheet of glass from a mass of molten glass, sustaining the side edges of said sheet until the sheet has reached such a condition that there is little tendency for it to narrow or shrink, and progressively stripping the sheet from the means that sustains same after the sheet has reached such a point that there is little tendency for it to narrow down or contract.

4. An apparatus for drawing a sheet of glass from a molten mass of glass provided with means for supporting and sustaining the side edges of the sheet until it is in such a condition that there is little tendency for it to shrink or become narrow, and means for progressively stripping the sheet from said sustaining means.

5. An apparatus for making sheet glass comprising means for drawing a sheet of glass from a molten mass of glass, endless belts for supporting the side edges of said sheet as it draws away from said molten mass so as to counteract the tendency of the sheet to shrink or narrow down, and burners arranged to project flames onto said members so as to strip the sheet therefrom after the sheet reaches a certain condition.

In testimony whereof I hereunto affix my signature in the presence of two witnesses, this 27th day of January, 1912.

ALLAN P. WHITTEMORE.

Witnesses:
WELLS L. CHURCH,
GEORGE BAKEWELL.